Sept. 12, 1967

P. THAULOW

FAST RESET OF AN INTEGRATOR-AMPLIFIER USING REED SWITCHES

Filed May 13, 1963

3,341,696

INVENTOR.

PER THAULOW

BY

Paul R. Harder

ATTORNEY

United States Patent Office 3,341,696

Patented Sept. 12, 1967

3,341,696
FAST RESET OF AN INTEGRATOR-AMPLIFIER USING REED SWITCHES

Per Thaulow, San Francisco, Calif., assignor to Beckman Instruments, Inc., a corporation of California Filed May 13, 1963, Ser. No. 279,821
7 Claims. (Cl. 235—183)

This invention generally relates to an electronic integrator for use in an analog computer and more particularly to an electronic integrator having a greatly reduced reset time period.

In analog computers of the therative type it is the common practice to provide in sequence the modes of HOLD, INITIAL CONDITION, HOLD and COMPUTE. During the COMPUTE mode the integrator provides at its output terminal an electrical signal that is proportional to the integral of an input signal applied to the input terminal. To condition the integrator for operation, a constant (initial condition) voltage signal representing the value of the function at time zero must be introduced into the integrator prior to the COMPUTE mode. In analog computers of the iterative type this initial condition voltage seldom corresponds to the voltage stored across the capacitor at the end of the prior COMPUTE mode. Thus, the integrator must be reset which requires either charging or discharging a capacitor from the voltage stored at the end of the compute cycle to that dictated by the initial condition voltage. This resetting occurs during the INITIAL CONDITION mode and it is obvious that by decreasing the reset time of the integrator the INITIAL CONDITION mode time period may be shortened. Since the computer will be in the INITIAL CONDITION mode many times during the course of the solution of a problem, by reducing the time required to reset the integrators, the INITIAL CONDITION mode time periods may be shortened resulting in a decrease in the length of time, required by the computer in the solution of the problem.

It is therefore the principal object of this invention to substantially reduce the time required to reset an electronic integrator.

Another object of the invention is to reduce the reset time period of the integrator without substantially affecting the operation of the integrator in the COMPUTE mode.

A further object is to provide a circuit for an electronic integrator which is equivalent to reducing the size of the feedback capacitor in the INITIAL CONDITION mode thus decreasing the RC time constant of the feedback network without affecting the operation of the integrator in the COMPUTE mode.

A still further object of the invention is the provision of a fast reset circuit for an integrator such that the INITIAL CONDITION mode time period required for ten time constants of the feedback network is reduced by a factor of approximately 20 or more.

The invention is described in greater detail in reference to the accompanying drawings wherein an exemplary preferred embodiment of the invention is illustrated and in which.

Figure 1:
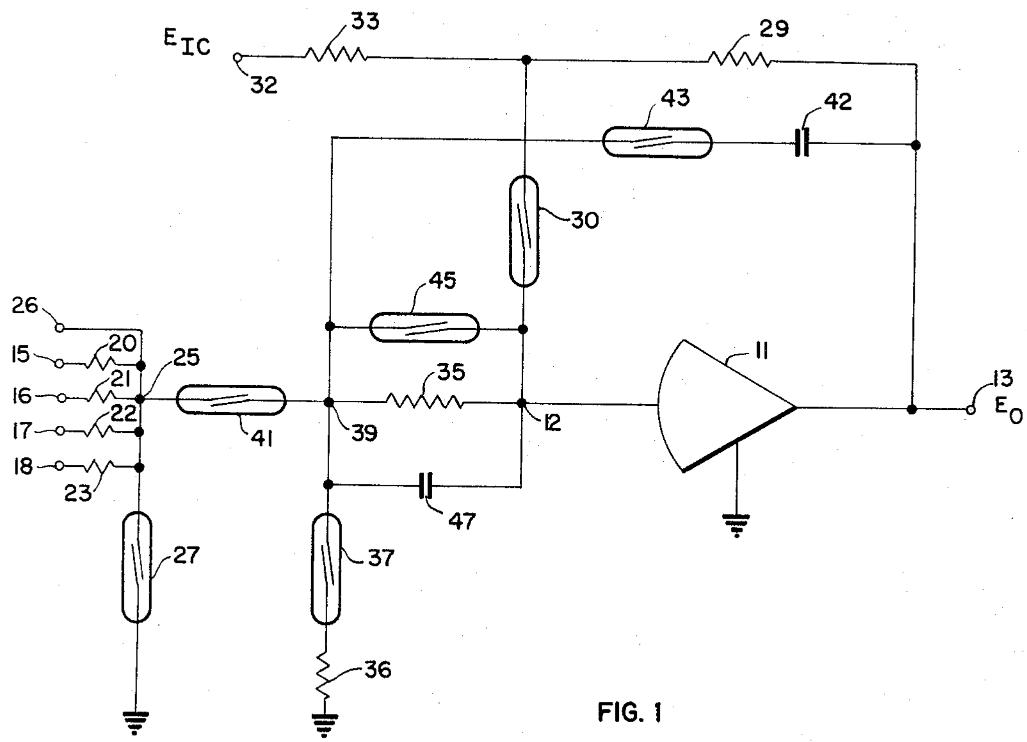
FIG. 1 is a circuit diagram of an exemplary embodiment of the invention.

Referring now in greater detail to the drawing and more particularly to FIG. 1 thereof there is illustrated an exemplary embodiment of an electronic integrator incorporating the present invention. The integrating circuit generally comprises a high gain, single-ended amplifier 11 having a grid or input terminal 12 and an output terminal 13 which corresponds to the output terminal of the integrating circuit. Amplifier 11 is preferably of the type having a gain in the order of $-10^8$ and a high input impedance. Input terminals 15–18 are respectively connected through precision input resistors 20–23 to a common lead or summing junction 25. The summing junction is connected to terminal 26 which forms an external summing junction terminal utilized in a manner familiar to those skilled in the art such, for example, as obtaining complex transfer impedances through the use of RLC-networks. Summing junction 25 is connected to a point of reference potential or circuit ground through "not" compute relay 27 which is open only during the COMPUTE mode.

One end of initial condition feedback resistor 29 is directly connected to output terminal 13 of amplifier 11 and the other end thereof is connected through relay 30 to the amplifier grid terminal 12. An initial condition input terminal 32 adapted to receive an initial condition input voltage signal $E_{IC}$ is connected through an input resistor 33 to the junction of the feedback resistor 29 and relay 30. In the normal electronic integrating circuit the feedback capacitor is generally connected between the output and grid terminals of the operational amplifier and the summing junction is generally directly connected to the grid terminal through an appropriate switch or relay. The embodiment illustrated in FIG. 1 however provides, after the teachings of this invention, a circuit whereby the output current from the amplifier required to charge the feedback capacitor is returned to circuit ground and the amplifier grid. As will be illustrated hereinafter this is equivalent to reducing the size of the feedback capacitor in the INITIAL CONDITION mode.

To accomplish this, resistors 35 and 36 and relay 37 are provided. Resistor 35 is serially connected between the grid terminal 12 of amplifier 11 and junction 39 which is connected through a compute relay 41 to summing junction 25. Junction 39 is connected through relay 37 and resistor 36 in electrical series circuit to circuit ground. One plate of feedback capacitor 42 is directly connected to the output terminal 13 of amplifier 11 and the other plate thereof is connected through an appropriate select relay 43 to junction 39.

It should be understood that several capacitors of different values may be connected between the output terminal 13 and junction 39 through suitable select relays such that any one of several capacitors may be selected from the computer pinboard or patchboard through the appropriate relay. Relay 45 shunts resistor 35 and is closed only when amplifier 11 is connected in the computer as either a high gain amplifier or a summing amplifier. Relay 45 remains open during all modes of the computer when amplifier 11 is connected as the operational amplifier in an integrating circuit. A small value capacitor 47 is connected between junction 39 and grid terminal 12 and shunts resistor 35 for the purpose of added stability at higher frequencies. If the impedance of resistor 35 is small with respect to the input impedance of amplifier 11 this series resistor does not detectably affect the DC gain of the amplifier and therefore has no appreciable effect on the circuit in the COMPUTE mode.

Figure 2:
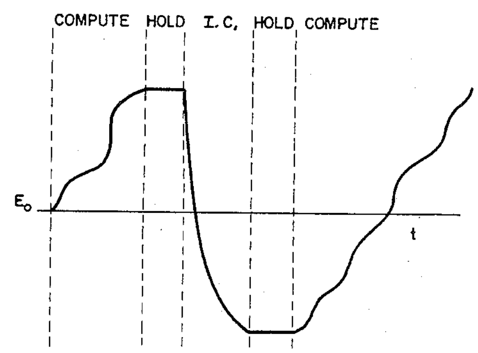
FIG. 2 illustrates the output of the integrating circuit during the various computer modes.
Figure 3:
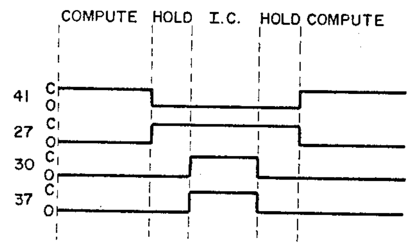
FIG. 3 illustrates the duty cycle of various relays in the integrating circuit during the various modes of operation of the computer.

Referring now to FIGS. 2 and 3 there is respectively illustrated the output voltage $E_O$ at the output terminal 13 as a function of time as the computer progresses through the various modes and the condition of the relays during these modes. In FIG. 3, O indicates that the relay is open and C indicates that the relay is closed. When the amplifier is converted to the operational amplifier in an integrating circuit the capacitor select relay 43 is always closed and the relay 45 is always open therefore these relays have not been indicated.

In the COMPUTE mode the compute relay 41 is closed and the "not" compute relay 27 is open therefore the summing junction 25 is connected to the grid terminal 12 via resistor 35 and the output voltage $E_O$ is the negative integral of the input voltage applied to the summing junction. At the end of the COMPUTE mode and during the HOLD mode compute relay 41 is opened and "not" compute relay 27 is closed thus grounding the input junction 25 until the next COMPUTE mode. In the INITIAL CONDITION mode relays 30 and 37 are closed and a potential is applied to the initial condition terminal 32 which represents the negative of the desired initial condition for the next COMPUTE mode. The input current is supplied from the initial condition terminal 32 through input resistor 33 and relay 30 to the grid terminal 12 of amplifier 11. The feedback current from the output of the amplifier is supplied through feedback resistor 29, capacitor 42 and resistor 35 to the grid terminal 12. Part of the feedback current through capacitor 42 is also returned through relay 37 and resistor 36 to circuit ground. This arrangement will pass a large portion of the capacitor charging current through circuit ground.

Without the resistors 35 and 36 and with junction 39 directly connected to the grid terminal 12 as is the usual case for electronic integrators the time constant of the feedback network is the value of the initial condition feedback resistor times the feedback capacitor, that is:

$$t=R_{29}C_{42} \quad (1)$$

The transfer function of the circuit is:

$$\frac{E_{out}}{E_{in}}=-\frac{1}{1+sR_{29}C_{42}} \quad (2)$$

where $s$ is the Laplace operator.

With the resistors 35 and 36 connected after the teachings of this invention the transfer function is:

$$\frac{E_{out}}{E_{in}}=-\frac{1+\frac{R_{35}R_{36}sC_{42}}{R_{35}+R_{36}}}{\frac{1+(R_{29}=R_{35})R_{36}sC_{42}}{R_{35}+R_{36}}} \quad (3)$$

If the factor $$\frac{R_{35}R_{36}sC_{42}}{R_{35}+R_{36}}$$

is small for the frequencies under consideration then:

$$\frac{E_{out}}{E_{in}}\approx-\frac{1}{1+sR_{29}C_{42}\cdot\frac{R_{36}}{R_{35}+R_{36}}} \quad (4)$$

The equivalent first order time constant is therefore:

$$t\approx\frac{R_{36}}{R_{35}+R_{36}}\cdot R_{29}C_{42} \quad (5)$$

Referring again to Equation 1 it is apparent that the result of this invention is that the time constant of the charging circuit has been multiplied by a factor of $R_{36}/(R_{35}+R_{36})$. Where the value of $R_{36}$ is small compared to the value of $R_{35}$ the factor will be substantially less than one and the time constant will be greatly decreased. The value of $R_{36}$ is limited only by the maximum current that the amplifier can deliver.

In a practical embodiment of the invention utilizing an amplifier having an input impedance of at least $10^{12}$ ohms, a gain of approximately $-10^8$ and capable of delivering an output current of approximately 25 ma., the following parameters were utilized:

$R_{29}=100K$
$R_{33}=100K$
$R_{35}=22K$
$R_{36}=1K$
$C_{42}=1\ \mu f.$

The time required for the output voltage to reach 0.01% of its final value is approximately ten time constants. For $C_{42}$ equals 1 $\mu$f., the previous circuits wherein the feedback capacitor is connected directly to the amplifier grid input terminal required approximately 1 second to reach this value utilizing the foregoing parameters. With an electronic integrator constructed after the teachings of this invention and utilizing the same parameters the time required for the output voltage to reach 0.01% of its final value or approximately ten time constants is approximately 50 milliseconds. Thus, the time required to reset the amplifier from the value stored across the capacitor at the end of the COMPUTE mode to the value to be stored for the next COMPUTE mode has been decreased by a factor of approximately 20. Thus, the period of time that the computer must remain in the INITIAL CONDITION mode has been reduced by a factor of approximately 20 and it is apparent that during the solution of a complex problem wherein the computer enters the INITIAL CONDITION mode numerous times throughout the problem the total length of time required for the solution has been greately decreased.

In the circuit constructed after the teachings of this invention the output current required to charge the feedback capacitor is returned not only to the amplifier grid as has been the practice in the prior art but is also returned to ground which provides the path for a large portion of the capacitor charging current. This circuit is equivalent to reducing the size of the feedback capacitor in the INITIAL CONDITION mode. The invention further requires only the addition of two resistors and two relays per amplifier and it is therefore simple of construction and economical. The various relays may be of any suitable type such, for example, as the reed relays commonly used in the art.

Although the invention has been described with particularity in connection with FIG. 1 it is to be understood that the figure is merely an exemplary embodiment of the invention and that variations and modifications thereof are apparent to and within the scope of those skilled in the art without departing from the scope of the appended claims.

What is claimed is:

1. In an analog computer having the modes of COMPUTE, HOLD and INITIAL CONDITION, an electronic integrator having a reduced reset time period, the improvement comprising:
   - an amplifier having an input terminal, an output terminal and circuit ground;
   - a plurality of input impedances connected to form a summing junction;
   - first impedance means;
   - means connecting said summing junction to said input terminal through said first impedance means during said COMPUTE mode;
   - feedback impedance means connected to said output terminal;
   - an initial condition input terminal;
   - switch means connecting said feedback impedance means and said initial condition input terminal to the input terminal of said amplifier during said INITIAL CONDITION mode;
   - storage means connected to said output terminal and through said first impedance means to said input terminal during said COMPUTE and INITIAL CONDITION modes; and
   - means connecting said storage means to circuit ground during said INITIAL CONDITION mode.

2. In an analog computer having the modes of COMPUTE, HOLD and INITIAL CONDITION an electronic integrator having reduced reset time period, the improvement comprising:
   - an amplifier having an input terminal, an output terminal and circuit ground;
   - a plurality of input impedances connected to form a summing junction;
   - first impedance means;
   - means connecting said summing junction to said input terminal through said first impedance means during said COMPUTE mode;
feedback impedance means connected to said output terminals;
an initial condition input terminal;
switch means connecting said feedback impedance and said initial condition input terminal to the input terminal of said amplifier during said INITIAL CONDITION mode;
storage means connected to said output terminal and through said first impedance means to said input terminal during said INITIAL CONDITION and COMPUTE modes;
second impedance means; and
means connecting the junction of said storage means and said first impedance means to circuit ground through said second impedance means during said INITIAL CONDITION mode.

3. In an analog computer having the modes of COMPUTE, HOLD and INITIAL CONDITION a high gain operational amplifier that may be selectively connected as an integrator, a summing amplifier or a high gain amplifier, said amplifier having an input terminal, an output terminal and a common terminal, the improvement comprising:
a summing junction;
first means connecting said summing junction to said input terminal, said means including a serially connected resistor when said amplifier is connected in an integrating circuit and directly connecting said summing junction to said input terminal when said amplifier is connected as a summing amplifier or as a high gain amplifier;
feedback impedance means connected to said output terminal;
switch means connecting said feedback impedance to said input terminal during said INITIAL CONDITION mode when said amplifier is connected in an integrating circuit with a feedback current between said input and output terminals;
storage means connected to said output terminal and to said first means, said first means connecting said storage means through said serially connected impedance means when said amplifier is connected in an integrating circuit; and
second means connecting said storage means to said common terminal during said INITIAL CONDITION mode when said amplifier is connected in an integrating circuit for returning the greater portion of said feedback current during said INITIAL CONDITION mode to said common terminal.

4. A reset circuit for an electronic integrator of the type having a high gain amplifier and an integrating capacitor connected between the input and output terminals thereof, and having a circuit ground, the combination comprising:
first and second resistors connected in series between said output terminal and an initial condition input signal source;

a third resistor having two terminals, one terminal connected to said input terminal and a second terminal connected to the input stage of said amplifier;
first switching means for connecting a junction between said first and second resistors to the second terminal of said third resistor for resetting said integrator;
and a second switching means connected in series with a fourth resistor between said input terminal and said circuit ground for connecting said input terminal to circuit ground while said first switching means is connecting the junction between said first and second resistors to the second terminal of said third resistor.

5. The combination as defined in claim 4 including a capacitor connected in parallel with said third resistor.

6. A reset circuit for an electronic integrator of the type having a high gain amplifier and an integrating capacitor connected between the input and output terminals thereof, and having a circuit ground, the combination comprising:
a first impedance means coupling said input terminal to the input stage of said amplifier;
first and second resistors connected in series between said output terminal and an initial condition input signal source;
first switching means for connecting a junction between said first and second resistors to the input stage of said amplifier;
and a second switching means connected in series with a second impedance means between said input terminal and said circuit ground for connecting said input terminal to circuit ground while said first switching means is connecting the junction between said first and second resistors to the input stage of said amplifier.

7. The combination as defined in claim 6 including a capacitor connected in parallel with said first impedance means.

References Cited

UNITED STATES PATENTS

| | | | |
|---|---|---|---|
| 2,789,761 | 4/1957 | Merrill et al. | 235—183 X |
| 2,843,736 | 7/1958 | Huntley | 320—1 X |
| 2,891,725 | 6/1959 | Blumenthal et al. | 235—183 |
| 3,121,827 | 2/1964 | Arnold | 317—140 |
| 3,129,326 | 4/1964 | Balaban | 235—183 |
| 3,231,728 | 1/1966 | Kusto | 235—183 |
| 3,249,925 | 5/1966 | Single et al. | 235—183 X |

OTHER REFERENCES

Picciano, J. K., et al.: Electronic Integration System for Low Level Fast Signals. IBM Technical Disclosure Bulletin, pages 105–106.

Korn, G. A. et al.: Electronic Analog Computers, N.Y. McGraw-Hill, 1956, pages 345–349.

MALCOLM A. MORRISON, *Primary Examiner.*

I. KESCHNER, J. F. RUGGIERO, *Assistant Examiners.*